US006668757B2

(12) United States Patent
Marchioro

(10) Patent No.: US 6,668,757 B2
(45) Date of Patent: Dec. 30, 2003

(54) CRAWLING TUBE FOR SMALL MAMMALS

(75) Inventor: Domenico Marchioro, Castelnovo di Isola Vicentina (IT)

(73) Assignee: Marchioro S.p.A. Stampaggio Materie Plastiche, Castelnovo di Isola Vicentina (IT)

( * ) Notice: Subject to any disclaimer, the term of this patent is extended or adjusted under 35 U.S.C. 154(b) by 17 days.

(21) Appl. No.: 09/862,602

(22) Filed: May 23, 2001

(65) Prior Publication Data

US 2001/0052328 A1 Dec. 20, 2001

(30) Foreign Application Priority Data

May 30, 2000 (IT) .................................. PD20000038 U

(51) Int. Cl.⁷ ................................................ A01K 1/00
(52) U.S. Cl. ...................................... 119/452; 119/416
(58) Field of Search ................................. 119/416, 452, 119/422, 417, 421, 702; 138/157, 120, 121, 128; 285/14

(56) References Cited

U.S. PATENT DOCUMENTS

| 1,350,073 A | * | 8/1920 | Dow | 285/280 |
|---|---|---|---|---|
| 2,358,588 A | | 9/1944 | Palmer | |
| 2,735,450 A | * | 2/1956 | Brayton et al. | 138/160 |
| 3,374,634 A | * | 3/1968 | Fochler | 405/49 |
| 3,566,607 A | * | 3/1971 | Sixt | 405/49 |
| 3,859,961 A | | 1/1975 | Willinger | 119/15 |
| 3,861,153 A | * | 1/1975 | Maroschak | 405/49 |
| 3,878,685 A | * | 4/1975 | Schmunk | 405/49 |
| 4,113,818 A | * | 9/1978 | Drossbach | 264/154 |
| 4,222,594 A | * | 9/1980 | Skinner | 285/280 |
| 4,273,367 A | * | 6/1981 | Keeney et al. | 285/419 |
| 4,458,895 A | * | 7/1984 | Turcotte | 280/206 |
| 5,357,905 A | * | 10/1994 | Gordon | 119/708 |
| 5,664,524 A | | 9/1997 | Piglia | 119/452 |
| 5,664,525 A | * | 9/1997 | Phillips et al. | 119/452 |
| 5,921,204 A | * | 7/1999 | Johnson | 119/416 |
| 6,488,053 B1 | * | 12/2002 | Tadokoro | 138/156 |

FOREIGN PATENT DOCUMENTS

NL   6 410 672   3/1966 ................. 119/452

* cited by examiner

Primary Examiner—Robert P. Swiatek
Assistant Examiner—Bethany L Griles
(74) Attorney, Agent, or Firm—Guido Modiano; Albert Josif; Daniel O'Byrne

(57) ABSTRACT

A crawling tube for small mammals comprising a plurality of circumferential slotted holes which are arranged side by side on at least one row along a longitudinal extension of the tube so as to provide ventilation grilles.

8 Claims, 1 Drawing Sheet

CRAWLING TUBE FOR SMALL MAMMALS

BACKGROUND OF THE INVENTION

The present invention relates to a crawling tube for small mammals.

Straight or curved crawling tubes for small mammals are already currently commercially available.

These tubes are used, for example, to connect a plurality of cages for small mammals and allow them to move from one cage to another as required or just for amusement.

Currently commercially available tubes, however, are substantially closed and do not allow optimum ventilation of the path followed by the small mammals.

SUMMARY OF THE INVENTION

The aim of the present invention is to solve or substantially reduce the ventilation problems of conventional crawling tubes for small mammals.

Within this aim, an object of the present invention is to provide tubes whose structure allows ventilation inside the path followed by the small mammals.

Another object is to provide tubes which are inexpensive and have a simple structure.

This aim and these and other objects which will become better apparent hereinafter are achieved by a crawling tube for small mammals, characterized in that it comprises a plurality of circumferential slotted holes which are arranged side by side on at least one row along a longitudinal extension of the tube so as to provide ventilation grilles.

BRIEF DESCRIPTION OF THE DRAWINGS

Further characteristics and advantages of the invention will become better apparent from the description of a preferred but not exclusive embodiment thereof, illustrated only by way of non-limitative example in the accompanying drawings, wherein.

DESCRIPTION OF THE PREFERRED EMBODIMENTS

Figure 1:
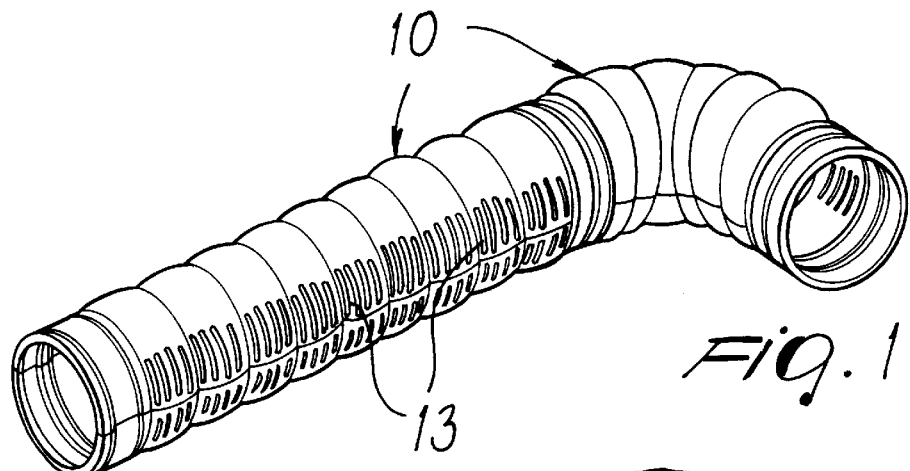
FIG. 1 is a perspective view of a straight tube portion and of a curved tube portion according to the invention, shown in the assembled condition.
Figure 2:
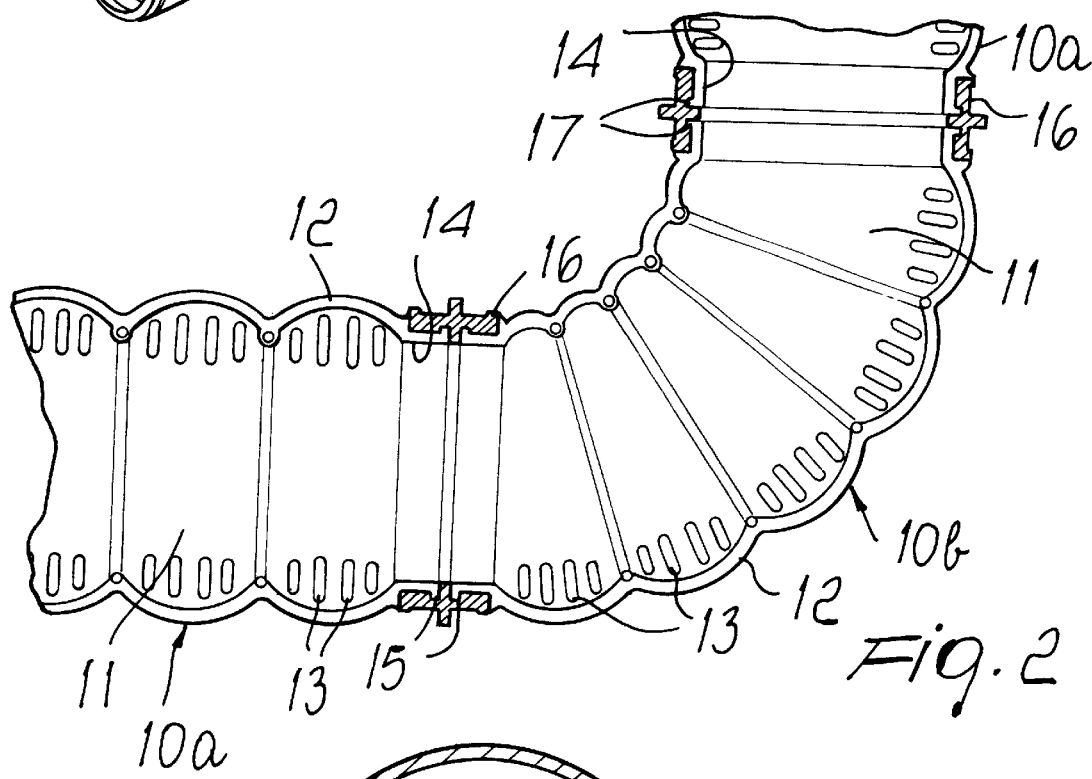
FIGS. 2 and 3 are two sectional views, taken respectively along a longitudinal plane and along a transverse plane, of the assembly shown in FIG. 1.
Figure 3:
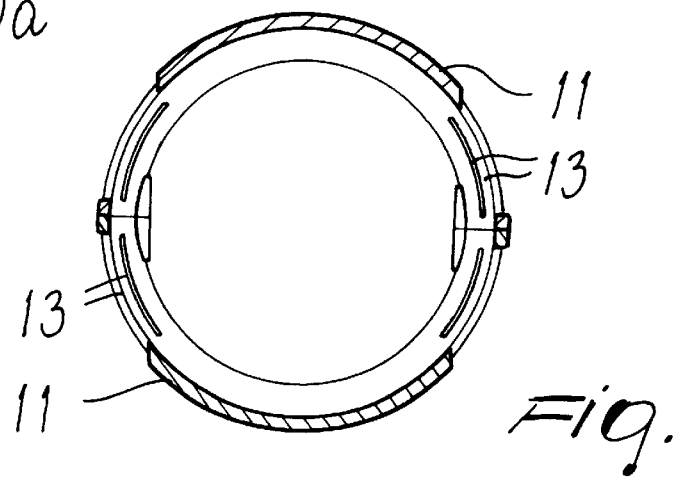

With reference to the figures, a tube according to the invention is generally designated by the reference numeral 10.

The tube 10 is of the straight or curved corrugated type, designated by the reference numerals 10a and 10b respectively, obtained by interlocking or gluing two shells 11 made of plastics which are obtained by molding.

Each shell 11 has, adjacent to a longitudinal edge 12 thereof, which can be a substantially straight edge or the longer curved edge, a plurality of circumferential slotted holes 13 arranged side by side in rows along the longitudinal extension of tube 10, so as to define ventilation grilles.

The end portions 14 of each tube 10 are provided with a radially arranged peripheral rim 15 which allows, by using an annular coupling 16, to connect multiple contiguous tubes 10.

In fact, the annular coupling 16 is internally provided with two circumferential slots 17 which constitute seats for accommodating, as a consequence of elastic deformation, the rims 15 of two tubes 10 to be arranged mutually contiguous.

In practice it has been observed that the present invention has achieved the intended aim and objects.

In particular, it can be seen that the grilles provided by the slotted holes allow optimum ventilation of the inside of the tube, improving the comfort of the animals, which is a very important aspect.

All the details may be replaced with other technically equivalent elements.

The materials, so long as they are compatible with the contingent use, as well as the dimensions, may be any according to requirements.

The disclosures in Italian Utility Model Application No. PD2000U000038 from which this application claims priority are incorporated herein by reference.

What is claimed is:

1. A crawling tube for small mammals, comprising:
   a first shell having longitudinal edges extending along a longitudinal extension thereof;
   a second shell having longitudinal edges extending along a longitudinal extension thereof; and
   a plurality of circumferential slotted hales arranged side by side adjacent to, and along at least one of said longitudinal edges of said first and second shells so as to form at least one longitudinal row of slatted holes;
   said first and second shells being connected to each other along said longitudinal edges so as to form the tube with ventilation grilles provided by said at least one row of slatted holes arranged along a longitudinal extension thereof.

2. The tube of claim 1, wherein said first and second shells are corrugated and are joined along said longitudinal edges thereof so as to form the tube wit a straight configuration.

3. The tube of claim 1, wherein said first and second shells are corrugated and are joined along said longitudinal edges thereof so as to form the tube with a curved configuration.

4. The tube of claim 1, wherein said first and second shells are obtained by molded plastic material.

5. The tube of claim 1, further comprising radial peripheral rims provided at opposite, respective end portions thereof.

6. The tube of claim 5, further comprising an annular coupling provided with two end circumferential slots constituting two seats, each of said seats being adapted to accommodate a said radial peripheral rim of the tube inserted therein by way of elastic deformation.

7. In combination, a plurality of tubes and annular couplings as set forth in claim 6, said plurality of tubes being joined to each by interposition of a respective annular coupling so as to form a tube assembly.

8. A crawling tube for small mammals, comprising:
   a first upper shell having longitudinal edges extending along a longitudinal extension thereof;
   a second lower shell having longitudinal edges extending along a longitudinal extension thereof;
   a plurality of circumferential slotted boles arranged side by side adjacent to, end along at least one of said longitudinal edges of said first and second shells so as to form at least one longitudinal row of slotted holes, said first and second shells being connected to each other along said longitudinal edges so as to form the tube with sideways ventilation grilles provided by said at least one row of slotted holes arranged along a longitudinal extension thereof;

radial peripheral rims being provided at opposite, respective end portions the tube; and an annular coupling having two end circumferential slots constituting two seats, said seats being each adapted to accommodate a said radial peripheral rim of the tube inserted therein by way of elastic deformation.

* * * * *